(12) United States Patent
Lewis, III

(10) Patent No.: US 6,214,233 B1
(45) Date of Patent: Apr. 10, 2001

(54) PROCESS FOR SIMULTANEOUS OXIDATION OF CYANIDE AND RECOVERY OF HEAVY METALS FROM WASTE WATER

(76) Inventor: Tom Lewis, III, R.D. #3, Box 135, New Alexandria, PA (US) 15670

( * ) Notice: Subject to any disclaimer, the term of this patent is extended or adjusted under 35 U.S.C. 154(b) by 0 days.

(21) Appl. No.: 09/102,218

(22) Filed: Jun. 22, 1998

Related U.S. Application Data

(63) Continuation-in-part of application No. 08/650,959, filed on May 21, 1996, now Pat. No. 5,770,090, which is a continuation of application No. 08/317,200, filed on Oct. 3, 1994, now abandoned, which is a continuation-in-part of application No. 08/020,206, filed on Feb. 19, 1993, now abandoned, which is a continuation-in-part of application No. 07/387,165, filed on Jul. 28, 1989, now abandoned.

(51) Int. Cl.$^7$ .................................................... C02F 9/00
(52) U.S. Cl. ................. 210/662; 205/291; 210/668; 210/669; 210/677; 210/688; 210/904; 210/912
(58) Field of Search .................... 210/662, 668, 210/688, 758, 763, 904, 912, 669, 670, 677; 204/194; 205/287, 291

(56) References Cited

U.S. PATENT DOCUMENTS

| | | | |
|---|---|---|---|
| 4,652,352 | 3/1987 | Saieva | 204/105 R |
| 5,120,453 | * 6/1992 | Frame et al. | 210/904 |
| 5,635,078 | 6/1997 | Yan | 210/763 |

OTHER PUBLICATIONS

Bowers et al., *Proq. Wat. Tech.*, "Activated Carbon Processes for the Treatment of Chromium (VI)–Containing Industrial Watewaters", vol. 12, pp. 629–649 (1980).

Landrigan et al. *National Technical Information Service*, "Removal of Chromium from Plating Rinse Water Using Activated Carbon", EP–570/2–75–055, pp. 1–43 (1975).

* cited by examiner

*Primary Examiner*—Ivars Cintins
(74) *Attorney, Agent, or Firm*—Price & Adams

(57) ABSTRACT

A waste water stream containing cyanide bearing compounds and heavy metals such as copper, silver, nickel, iron and the like is directed from a source after pH adjustment to a first tank containing adsorption material in the form of granular activated carbon. The waste water is oxygenated by compressed air. The cyanide bearing compounds and heavy metal are adsorbed onto the surface of the adsorption material which is pretreated to an initial pH in the range between about 8.5 to 11. The effluent from the first tank is pH adjusted by a pH controller which adds a caustic solution to the effluent to maintain a control point pH. The pH adjusted effluent is directed toward a second tank containing pretreated adsorption materials. The water stream free of cyanide and metal contaminants is directed to an effluent tank for safe discharge. Thereafter a stripping solution preferably containing sulfuric acid is circulated through the tank to remove the adsorbed metal for the adsorption material. The metal is carried by the stripping solution from the tank to an electrolytic metal recovery unit. The unit includes a cathode terminal and the stripping solution passes through a voltage potential resulting in electrolytic deposit of the heavy metal onto the cathode terminal. The stripping solution free of the heavy metal is returned to a tank for reuse in the adsorption process. The cathode terminal is removed from the metal recovery unit to allow recovery of the metal for reuse.

14 Claims, 5 Drawing Sheets

PROCESS FOR SIMULTANEOUS OXIDATION OF CYANIDE AND RECOVERY OF HEAVY METALS FROM WASTE WATER

CROSS REFERENCE TO RELATED APPLICATION

This application is a continuation-in-part of application Ser. No. 650,959 filed May 21, 1996, now U.S. Pat. No. 5,770,090 which was a continuation of application Ser. No. 317,200 filed Oct. 3, 1994, abandoned, which was a continuation-in-part of application Ser. No. 020,206 filed Feb. 19, 1993, now abandoned, which was a continuation-in-part of application Ser. No. 387,165 filed Jul. 28, 1989, now abandoned.

BACKGROUND OF THE INVENTION

1. Field of the Invention

This invention relates to method and apparatus for removing cyanide based contaminants and recovering heavy metal such as copper, silver, nickel, iron, cobalt and the like from waste water streams, and more particularly to a process for removing cyanide base contaminants and heavy metal components from an effluent stream by adsorption of the heavy metal on a medium and thereafter stripping the adsorbed metal from the medium for recovering by electrolytic deposition.

2. Description of the Prior Art

The treatment of heavy metal and cyanide bearing effluent streams to prevent the discharge of pollutants in waterways has become the subject of federal legislation. The Environmental Protection Agency (EPA) has been charged with enforcing effluent limitations in publishing guidelines for the discharge of electroplating wastes into waterways. The need for such legislation has resulted from the use of copper, silver and the like in metal treating operations, such as plating, anodizing, conversion coatings, corrosion inhibition, pickling, and ore processing. These limitations also extend to the discharge of other plating solutions containing cyanide, copper, silver, nickel, iron, cobalt, and other multi-valent metals.

It is known to remove cyanide bearing compounds and heavy metal contaminants from waste water streams by performing a pH adjustment on the waste water stream in the range of 9–10. An oxidizing agent such as hypochlorite and sodium hydroxide is fed into the waste water stream to oxidize the cyanide bearing compounds. This reaction oxidizes the cyanides to cyanates (CNO) with complete oxidation obtained when the cyanates are further oxidized to carbon dioxide ($CO_2$) and nitrogen gas ($N_2$). Since this reaction is pH dependent, oxygen is also required in the reaction. Chemical precipitation is performed on the oxidized mixture to remove the heavy metals resulting in a heavy metal sludge material which requires disposal. Also, the remaining effluent is not suitable for recycling.

Another process for removing cyanide bearing compounds from waste water includes catalytic oxidation as disclosed in U.S. Pat. No. 5,635,078. The waste water is passed through a bed of an adsorbent catalyst, such as activated carbon, and a small amount of heavy metal is added to the stream. In the presence of cyanide and oxygen, the metal present in the stream reacts to give up electrons to drive the oxidation process. The metals are then adsorbed onto the activated carbon bed. The cyanide is oxidized by the reaction to nondetection levels, effectively removing the cyanide from the waste water.

While various methods are known to treat cyanide and heavy metal bearing effluents for the oxidation of the cyanide and the removal of metal contaminants, the known devices not only require substantial capital investment for equipment costs but create a secondary problem in the disposal of the recovered pollutant, particularly for disposal of the sludge which is extracted from the recovery process. The sludge must be handled in a manner that meets the requirements of disposal of solid wastes. Metallic sludges when mixed with garbage and organic wastes are likely to go back into solution as organic acids. When the pollutant is recovered as a metallic salt strict procedures must be followed to process them as a sanitary waste. Therefore there is need for method and apparatus in the treatment of cyanide and heavy metal bearing effluents that eliminates the problems associated with toxic metal sludges and produces an effluent stream which is environmentally safe.

There is a further need for a cyanide catalytic oxidation process which permits recovery of heavy metals present in the effluent stream, extends the operative life of the bed of adsorption material and produces an effluent which is suitable for recycling to the process area.

SUMMARY OF THE INVENTION

In accordance with the present invention there is provided a method for oxidizing cyanide and recovering heavy metal from waste water that includes the steps of oxygenating a waste water stream containing cyanide and heavy metal with air. The pH of the waste water stream is adjusted to a range between about 8.5 to 10. The surface of a bed of adsorption material is pretreated by a chemical solution having a pH in the range between about 8.5 to 11. The oxygenated waste water is passed through a bed of pretreated adsorption material to oxidize the cyanide bearing compounds in the waste water and adsorb the heavy metal in the waste water onto the surface of the adsorption material. The waste water free of heavy metal and cyanide is directed as an effluent stream away from the bed of adsorption material for discharge. The pH of the effluent stream exiting the bed of adsorption material is monitored to evaluate the capacity of the bed to adsorb the heavy metal while the bed remains on line. A decrease in pH of the effluent stream is detected to a preselected control point. A caustic solution of a preselected pH is supplied to reactivate the bed of adsorption material while on line when the pH of the effluent stream reaches the control point to restore the adsorptive capacity of the bed. The caustic solution is maintained in contact with the bed of exhausted adsorption material for a preselected period of time until the pH of the surface of the bed of adsorption material is restored to a preselected pH level. An acid stripping solution is passed through the bed of the adsorption material to strip the heavy metal from the surface of the adsorption material. The stripping solution containing the heavy metal is passed to an electrolytic recovery unit. The heavy metal from the stripping solution is electrolytically deposited onto a cathode terminal in the electrolytic unit. The heavy metal deposited onto the cathode terminal is recovered. The retained stripping solution is reused in subsequent cycles of stripping heavy metal from the surface of the adsorption material.

Further in accordance with the present invention there is provided a method for oxidizing cyanide while simultaneously recovering copper from waste water that includes the steps of oxygenating a waste water stream containing cyanide and copper with air. The pH level of the waste water stream is adjusted to a range between about 8.5 to 10. A bed of activated carbon is pretreated by circulating in a closed loop a solution containing 1% to 20% by volume sodium hydroxide through the bed of activated carbon for a preselected period of time until the pH of the surface of the bed reaches a level of 8.5 to 11. The waste water stream containing cyanide and copper is directed through the bed of activated carbon. The copper is adsorbed onto the surface of the activated carbon bed while oxidizing the cyanide. The pH of the waste water stream exiting the bed of activated carbon is monitored to evaluate the capacity of the bed to adsorb the copper while the bed remains on line. A decrease in the pH of the waste water stream is detected to a preselected control point. A caustic solution of a preselected pH is supplied to reactivate the activated carbon bed while in operation when the pH of the waste water stream reaches a control point to restore the adsorptive capacity of the bed. The caustic solution is maintained in contact with the activated carbon bed for a preselected period of time until the pH of the surface of the carbon bed is restored to a preselected pH level. A flow of waste water is interrupted once the adsorptive capacity of the adsorption material in the carbon bed is exhausted. A stripping solution containing 10% to 20% by volume sulfuric acid is passed through the exhausted activated carbon bed to strip the copper from the bed. The pH of the stripping solution is maintained at a level between about 1.5 to 2.5 by feeding fresh acid into the stripping solution to continue stripping copper from the bed. The stripping solution containing copper is directed to an electrolytic recovery unit. Copper from the stripping solution is electrolytically deposited onto a cathode terminal of the electrolytic recovery unit. The deposited copper is removed from the cathode terminal.

Accordingly, a principal object of the present invention is to provide a method for oxidizing cyanide bearing compounds while simultaneously recovering heavy metals from waste water effluent.

Another object of the present invention is to provide a method for recovering copper from a waste water stream containing cyanide bearing compounds.

A further object of the present invention is to provide a method for oxidizing cyanide bearing compounds while simultaneously recovering heavy metals from waste water used in the manufacture of computer parts, metal plating, mining operations, and other metal handling and treating processes that generate waste effluent containing cyanide bearing compounds and heavy metals.

An additional object of the present invention is to provide a process for the simultaneous removal of cyanide and heavy metal from a waste water effluent stream whereby the heavy metal is recovered for reuse without producing a toxic heavy metal sludge.

These and other objects of the present invention will be more completely disclosed and described in the following specification, the accompanying drawings, and the appended claims.

DESCRIPTION OF THE PREFERRED EMBODIMENTS

Figure 1:
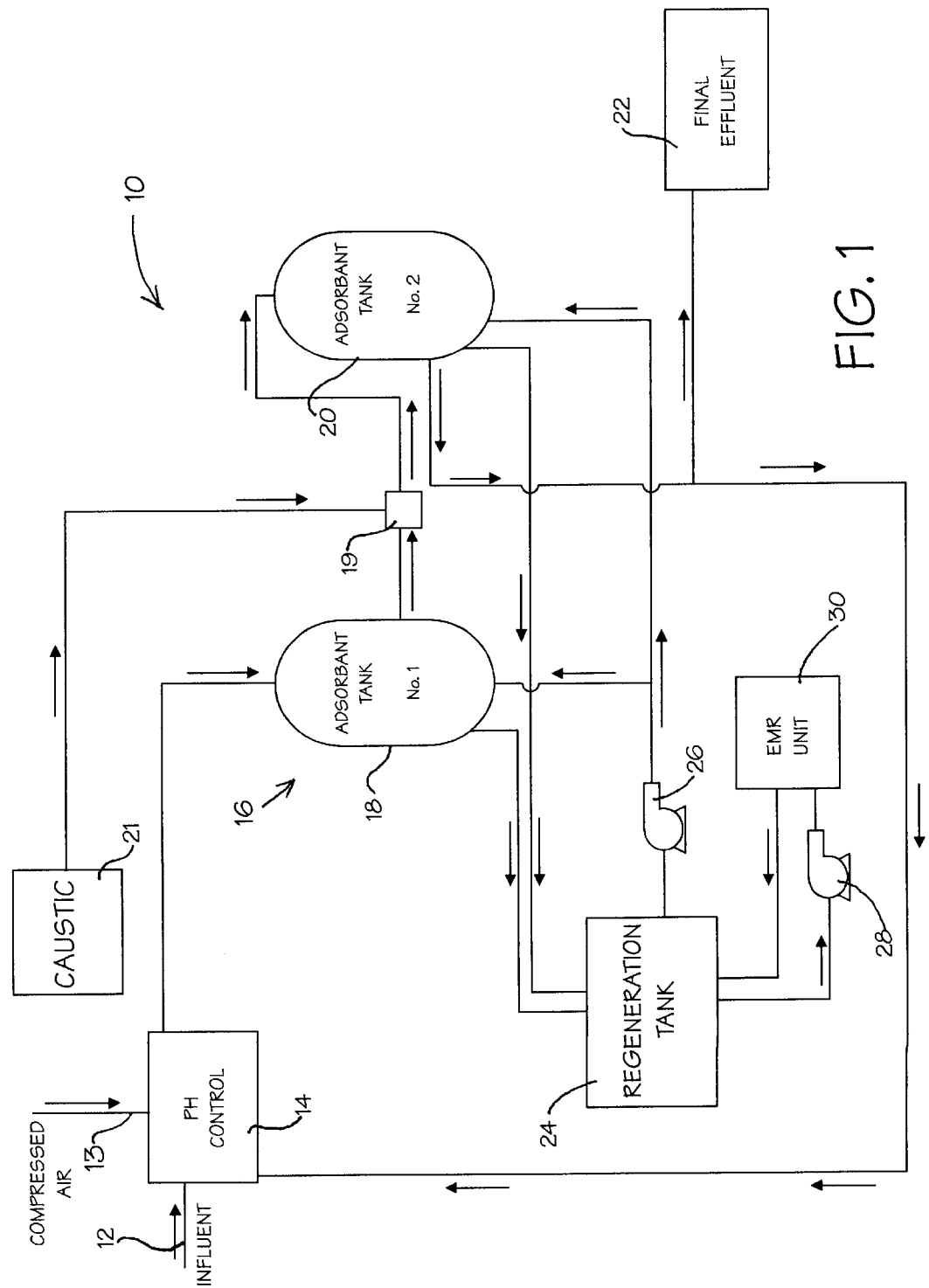
FIG. 1 is a schematic illustration of the apparatus used for recovering heavy metal from an effluent stream in accordance with the present invention.

Referring to the drawings and particularly to FIG. 1, there is illustrated apparatus, generally designated by the numeral 10, for catalytically oxidizing cyanide bearing compounds and removing and recovering a heavy metal pollutant from a waste water stream, such as copper, iron, silver, nickel, etc. The heavy metal pollutant is recovered as a solid metal product capable for reuse. Initially, an influent 12 in the form of a waste water stream containing a heavy metal based cyanide compound, such as copper or silver cyanide, is diverted, as for example, from an electroplating operation through a pH controller 14 for adjusting the pH of the waste water to a level between 8.5 to 10. The influent is oxygenated with compressed air 13 then directed to an adsorption device, generally designated by the numeral 16, that includes in one embodiment a pair of tanks or vessels 18 and 20.

The tanks 18 and 20 each contain a bed of activated carbon which is pretreated in accordance with the present invention to have a preselected pH for enhancing the adsorption of the heavy metal components while catalytically oxidizing the cyanide from the influent stream. In the case of copper, the activated carbon in the tanks 18 and 20 adsorb the copper onto the surface of the carbon adsorption material which is pretreated with a 1%–20% by volume sodium hydroxide solution for a preselected period of time until the pH of the surface of the activated carbon bed reaches a pH level of between about 8.5 to 11 in tanks 18 and 20. As a result, the cyanide bearing compound is catalytically oxidized and the copper is adsorbed on the surface of the adsorption material.

In accordance with the present invention, upon exiting tank 18, the effluent enters a pH controller 19. In an on line adsorber pH regeneration mode, the pH controller 19 measures the pH level in the effluent and compares it against a preset control point typically in the range of 8.5 to 10. Upon measuring a pH level below the preset control point, the pH controller 19 mixes the effluent with a caustic solution from tank 21. The effluent containing the caustic solution then exits the pH controller 19 into adsorption tank 20, where it remains for a preselected residence time to regenerate the adsorptive capacity of the activated carbon bed. The remaining cyanide bearing compounds are catalytically oxidized and the heavy metal is adsorbed on the surface of the adsorption material. The effluent exits tank 20 essentially free of metal and cyanide contamination and is directed to the final effluent tank 22 which is provided with a pH control and an agitator (not shown). By regenerating the adsorber material in an on line mode, the process is kept in operation for a longer period of time.

In an off line adsorber regeneration mode, the final effluent is not directed toward tank 22 and instead is directed into initial pH control 14, where it is re-directed through the adsorber tanks 18 and 20.

Thereafter in a regeneration step the heavy metal is stripped from the adsorption medium in tanks 18 and 20 by circulating through the tanks a stripping solution, such as sulfuric acid in an amount 10–20% by volume. In this manner the heavy metal is removed from the surface of the adsorption medium. The stripping solution is maintained in a regeneration tank 24 which is connected by conventional valving to both of the adsorption tanks 18 and 20. Preferably the pH of the stripping solution is maintained at a level between about 1.5 to 2.5 by feeding fresh acid thereto as required for the continuous stripping of heavy metal.

Tanks 18 and 20 are separately regenerated. For example, pump 26 directs the stripping solution through an open and closed sequence of valves which first directs the stripping solution in a closed loop upwardly through tank 18 and back to regeneration tank 24. Then in a second path the stripping solution is directed in a closed loop up and through tank 20 and back to regeneration tank 24. After regeneration both tanks 18 and 20 are opened to allow the stripping solution remaining to flow back to regeneration tank 24.

After regeneration of the tanks 18 and 20 they are cleaned by pumping water through them and allowing the rinse water to drain to the regeneration tank 24. In one mode of operation tanks 18 and 20 are sequentially operated. While tank 18 operates to adsorb the heavy metal onto the surface of the adsorption medium, tank 20 is being stripped of the adsorbed contaminant. Then tank 20 is placed in the first or primary stage and tank 18 is stripped.

From the regeneration tank 24 the stripping solution containing the heavy metal, such as copper, is directed by pump 28 to an electrolytic metal recovery (EMR) unit 30. In the EMR unit 30 the metal for example copper, is electrically deposited onto the surface of a cathode terminal. The stripping solution is passed at a optimum rate through the EMR unit 30 at a potential of about 6–12 volts with a cathode current density ranging from between about 20 to 200 amp/ft$^2$. The cathode terminal is removed from the unit 26 and the deposited metal is stripped from the cathode surface.

The stripping solution is then recycled from the EMR unit 30 back to tank 24. From the tank 24 the regenerated stripping solution is available for further use in the regeneration of tanks 18 and 20.

From the pH control tank 14 a 1%–20% by volume caustic solution, preferably a sodium hydroxide solution, is used to pretreat the adsorption material. In this manner the efficiency of the tanks 18 and 20 to adsorb the heavy metal from the influent stream is maintained so that the final effluent in tank 22 is environmentally safe and free of toxic metal sludges. As discussed above, in an on line mode of pH regeneration, a measured quantity of caustic solution is added to the effluent by pH controller 19 between tanks 18 and 20 to maintain the efficiency of the adsorbant material to adsorb the heavy metal from the effluent stream. Further, in an off line mode of pH regeneration, the final effluent is re-routed from tank 20 to the pH controller 14 for re-introduction into the adsorption process, thereby increased the quantity of caustic solution directed toward the adsorbent material.

With the closed loop operation of the present invention adsorbing the heavy metal onto the bed of adsorption material occurs simultaneously with the pretreatment of the adsorption material. By pretreating the adsorption material to come into contact with a solution of a specific pH, either acidic or caustic, the surface of the adsorption material is treated to the pH of the surrounding chemical solution.

Figure 2:
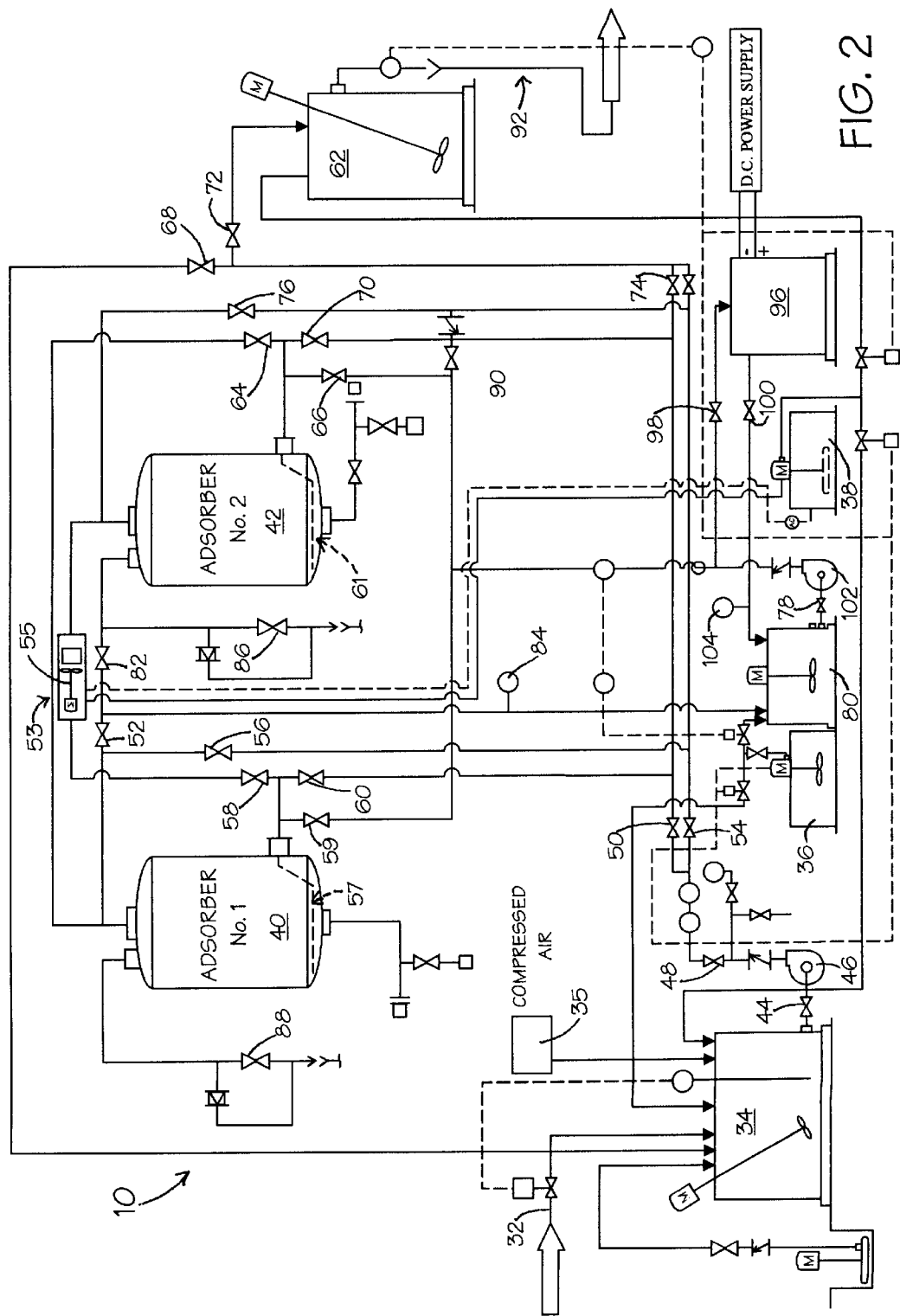
FIG. 2 is a diagrammatic illustration of the apparatus shown in FIG. 1.

Now referring to FIG. 2, there is illustrated in detail the apparatus 10 schematically illustrated in FIG. 1. Process waste water containing cyanide bearing compounds and heavy metal, such as copper, is directed through conduit 32 from a source of the waste water and fed into tank 34 for temporary storage. Tank 34 includes an agitator, level controller, and pH controller. A source of compressed air 35 directs air into tank 34 at a pressure of approximately 15 psi or less to oxygenate the waste water for a period of between 10 and 30 minutes. The oxygen injected into the waste water provides a basis for the oxidation process. In the case of a caustic application, the pH of the waste water is adjusted in a range between about 8.5 to 10. The pH controller adds acid or caustic materials from tanks 36 and 38 respectively to obtain the desired pH level. The pH adjusted waste water from tank 34 is then pumped through a pretreated granular activated carbon system that includes adsorber tanks 40 and 42 which are operable sequentially in a down flow mode of operation.

Sequence No. 1

In a first mode of operation of the present invention, valve 44 is open to feed pump 46 from which the waste water flows through open valve 48, while valves 50 and 52 are closed so that the fluid is directed through open valves 54 and 56 to the top of adsorber tank 40. Suitable process valves for the present invention are ball valves with a polypropylene lining. Preferably the instrument valves are electronically operated solenoid units of a plastic and stainless steel construction. Commercially available pumps operable for use in the recirculation and regeneration processes are magnetic drive centrifugal pumps, such as those supplied by March Manufacturing Co. under Model no. DP-6TMD.

The waste water proceeds through the adsorber tank 40 and exits therefrom through an underdrain system, generally designated by the numeral 57 positioned in the bottom of the tank 40. From the tank 40 the waste water proceeds through open valve 58 while valves 59 and 60 remain closed. In an on line mode of pH regeneration, the effluent from adsorber 40 is pH adjusted by a pH controller generally designated by the numeral 53. A commercially available pH controller suitable for use with the present invention is available from Great Lakes Instruments, Inc. The pH controller 53 includes an in-line mixer 55, as manufactured by Komax, for receiving and mixing caustic solution in the effluent piping from tank 38 upstream of adsorber tank 40. The pH controller 53 determines the pH level of the effluent and compares this with a preset control point typically between the range of 8.5 to 10. The pH controller then adds an effective amount of caustic to return the effluent to a pH level above the control point. From pH controller 53 the waste water enters the second adsorber tank 42.

The adsorber tanks 40 and 42 are identical in design and commercially available from Tigg Corporation. Both tanks utilize granular activated carbon from Calgon Carbon Corp. under the trademark "Filtrasorb 400", and are fabricated of steel and skid mounted. Each includes conventional pipes, valves and fittings. The tanks are lined with an abrasion flake glass coating available from Ceilcote Coatings Inc.

The waste water proceeds downwardly through adsorber tank 42 and exits through a second underdrain system, generally designated by the numeral 61. The waste water leaving adsorber tank 42 is substantially free of cyanide bearing compounds and metal contamination. The waste water is routed to final effluent tank 62 by closing valves 64, 66 and 68 and opening valves 70, 72 and 74. The final effluent tank 62 includes a pH controller for monitoring the pH of the effluent entering the tank 62 and an agitator.

The waste water leaving adsorber tank 42 is of sufficient quality that it can be used in the process as makeup water. This is accomplished by closing valve 72 and opening valve 68 so that the stream of water can be routed back to the feed tank 34. In this off line mode of pH regeneration, the water serves to dilute the effluent in tank 34 thereby increasing the caustic content and rejuvenating the adsorber tanks 40 and 42.

Sequence No. 2

In a second mode of operation, adsorber tank 40 is regenerated and adsorber tank 42 is placed in the primary stage of operation. The carbon adsorber is repeatedly treated on-line by a chemical solution to restore the surface of the carbon bed to a preferred initial pH level of, for example, 9.5. Pretreatment is accomplished by circulating through the bed a 1% to 20% by volume sodium hydroxide solution for a preselected period of time until the pH of the surface of the bed reaches a level of 8.5 to 11.

In operation valve 56 is first closed and valve 76 opened. By opening valve 76, waste water is permitted to enter the top of adsorber tank 42 and exit to the effluent tank 62. Regeneration of adsorber tank 40 is commenced by opening valve 78 connected to regeneration tank 80. Valve 66 is closed, and valve 59 is opened with valves 58 and 60 being closed. Consequently the acid regenerant solution is circulated through adsorber tank 40 and exits from the top of the tank. The acid regenerant solution is then directed through open valve 52 with valve 82 closed so that the effluent is recycled back through and into regenerant tank 80. The recirculation step is continued until a test probe 84 connected to the line leading to the regenerant tank 80 indicates that the adsorbed metal ions have been stripped from the activated carbon bed in adsorber tank 40. A suitable test probe for use with the present invention is available from Sethco Inc. as model RTC-D.

The solution from adsorber tank 42 is drained back to the regeneration tank 80 by opening valve 86 which is connected in a manner not shown to the regeneration tank 80. Thereafter clean water, as from a municipal system, is rinsed through the adsorption tanks 40 and 42 by first closing valve 88 connecting regeneration tank 80 to adsorber tank 40 and opening valve 90 which is connected to a clean water source (not shown). Also in this operation valve 59 is opened and valve 78 is closed. This permits clean water to be recirculated through the adsorber tank 40 and then collected in the regeneration tank 80. Once this stripping operation for adsorber tank 40 is completed, it is ready to be returned to service in the adsorption mode of operation.

Sequence No. 3

In a similar manner, adsorber tank 42 is placed in operation while adsorber tank 40 is regenerated. This is accomplished by first opening valves 76 and 64, while closing valves 66 and 70. Consequently water now enters the top of adsorber tank 42 through valve 76 and exits therefrom through valve 64 and is routed to adsorber tank 40. The water exits the underdrain system 57 of adsorber tank 40, while valve 60 is opened and valves 52, 58 and 59 are closed.

The effluent from adsorber tank 40 then proceeds through open valves 60, 74 and 72, while valve 68 is maintained closed. Consequently, the final effluent is directed through tank 62 from which it can be discharged through the outlet system, generally designated by the numeral 92 where the effluent is of a quality that can be readily handled by a municipal water authority. On the other hand, if this water is to be recycled to the process area, valve 72 is closed and valve 68 is opened.

Sequence No. 4

To regenerate adsorber tank 42 while effluent is redirected downwardly through adsorber tank 40, valves 56 and 60 are opened and valves 52, 58 and 59 are closed. With this arrangement, adsorber tank 40 is operable to process the waste water. The water exits through valves 60, 74 and 72 to effluent tank 62. Then to regenerate adsorber tank 42, valves 78, 66 and 82 are opened, while valves 64, 70 and 52 are closed.

The regeneration solution is recirculated through adsorber tank 42 in an upward flow mode and recycled through valve 82 back to regeneration tank 80. After a sufficient period of time of regeneration, as indicated by the test probe 84, which is preferably a conductivity meter, the regeneration cycle is completed. The solution is then gravity drained back to regeneration tank 80 by opening valve 86.

Adsorber tank 42 is then rinsed with clean water, as for example, clean water from a municipal system, by opening valves 90, 66, and 82; while valves 64, 70, and 52 are closed. Preferably two bed volumes of city water are rinsed through the adsorber tanks during the regeneration cycle.

When adsorber tank 42 is being regenerated and adsorber tank 40 is in a primary stage of operation, water enters adsorber tank 40 through valve 56 and exits through valve 58, while valves 59 and 60 are maintained closed. The water then exits the second adsorber tank 42 through valves 70, 74 and 72, while valves 66, 64 and 76 are closed.

In the above sequences of operation a 1%–20% by volume sodium hydroxide solution from the pH control tank 34 is used to pretreat the adsorption material until the surface of the adsorption material reaches a pH level in the range 8.5 to 11. Also, the effluent pH is constantly monitored so that in the event the effluent exceeds a preselected pH level, for example below 8.5, the adsorption material is reactivated by exposing the material to the sodium hydroxide solution to restore the adsorption material to the initial preferred pH, for example 9.5. The acid for reactivating the adsorption material is supplied from the regeneration tank 80.

Electrolytic Metal Recovery

The operation of the electrolytic metal recovery (EMR) process involves recirculation of the metal-rich acid in regeneration tank 80 through a metal recovery module 96. The module 96 is preferably a plastic constructed tank with anode and cathode terminals, copper bussing and two agitators with impellers. A commercially available electrolytic metal recovery unit suitable for use with the present invention is available from Tri-State Plastics Co. The recovery operation is accomplished by first opening valves 78, 98, and 100 in a closed loop recirculation mode. During this valving sequence, valves 59, 66, and 90 are maintained closed. Pump 102 recirculates the acid from tank 80 through the metal recovery module 96.

Preferably the cathodes of the metal recovery module 96 are removable from the unit to permit the recovered metal to be stripped from the cathode surface, and thereby permit additional recovery of metal. Throughout this entire process and operation of the above described regeneration loop, the pH of the metal recovery step is adjustable. When the metal recovery operation is completed and the regeneration system is restored to a standby mode, valves 78, 98, 100 are closed and the supply of DC power to the module 96 is turned off.

EXAMPLE 1

Two glass column adsorption tanks were each filled with about 200 grams of Filtrasorb 400 granular activated carbon having a size of about 12×40 mesh. The surface of the carbon was pretreated by circulating through the carbon a 5% by volume sodium hydroxide solution at a pH in the range between about 8.5 to 11 for a period of 72 hours. In this manner, the capacity of the carbon to adsorb copper was substantially increased by pretreating the surface of the carbon to a pH of about 9.5. During the pretreating stage, 65 mls. of concentrated sodium hydroxide (50%) was adsorbed by the carbon. A feed solution containing 10 mg/l of cyanide, 1.0 mg/l of silver and 0.5 mg/l of copper was passed through the carbon columns in a down flow mode at a flowrate of 20 ml/min. The solution pH was adjusted to 8.5–9.5 and aerated with 15 psi compressed air at a flowrate of 0.1 scfm, not to exceed a control point pH of 10.0 for copper. The system was operated for 360 hours. Effluent samples were crystal clear and water white. The effluent stream averaged cyanide, silver and copper levels of <0.01 mg/l, 0.009 mg/l, and 0.005 mg/l respectively.

Regeneration of the granular activated carbon was performed with 1,500 ml. of a stripping solution consisting of sulfuric acid in a range of 10–20% by volume having a pH between 1.5 to 2.5. The stripping solution was recirculated in an up flow mode at 50 ml/min for 1–2 hours. The carbon column was then washed with 1,500 ml of water and returned to service. The stripping solution contained silver and copper concentrations of 271 mg/l and 132 mg/l respectively.

The stripping solution was held in a storage tank with recirculation equipment for directing the solution to the adsorption media units and the electrolytic metal recovery cell. The stripping was then processed in the EMR unit where the silver and copper were electrolytically deposited on stainless steel cathodes.

The stripping solution was passed through the EMR unit at a voltage potential of between about 6–12 volts and cathode current densities ranging from 10–100 amp/ft$^2$. The EMR unit included an ion selective membrane compartment around the anode. The EMR unit produced a brownish gray deposit on the cathode. The stripping solution was then recycled back to the storage tank for use in the next stripping cycle.

EXAMPLE 2

Two plastic adsorption canisters were each filled with about 330 pounds of pretreated activated carbon granular, 12×40 mesh, sold under the trademark Filtrasorb 400. The surface of the carbon was pretreated by circulating through the carbon column a 5% by volume sodium hydroxide solution having a pH in the range between about 8.5 to 11 for a period of 72 hours. In this manner, the capacity of the carbon to adsorb silver and copper was substantially increased by pretreating the surface of the carbon to a pH of about 9.5. During the pretreating stage, 2,000 mls. of concentrated sodium hydroxide (50%) was adsorbed by the carbon. A feed solution containing 2,000 mg/l of cyanide, 99 mg/l of silver and 1,088 mg/l of copper was passed through the carbon columns in a down flow mode at a flowrate of 5 gallon per minute. The solution pH was adjusted to 8.5–9.5 and aerated with 15 psi compressed air at a flowrate of 0.5 scfm, not to exceed a control point pH of 10.0 for copper. The system was operated for 16 hours. The effluent stream averaged cyanide, silver and copper levels of 1.43 mg/l, <0.01 mg/l and 0.64 mg/l respectively. The system produced average removal levels for cyanide, silver, and copper of 99.99%, 99.99+%, and 99.99+% respectively.

With the prior art heavy metal removal processes using activated carbon, the influent is run through the carbon bed until the treated effluent exceeds measurable concentrations of the heavy metal. At this point the process is shut down because the activated carbon is regarded as being "exhausted" and unable to remove additional heavy metals with chemical regeneration. The exhausted carbon bed is then removed from the process line and a fresh carbon bed is brought on-line.

Figure 3:
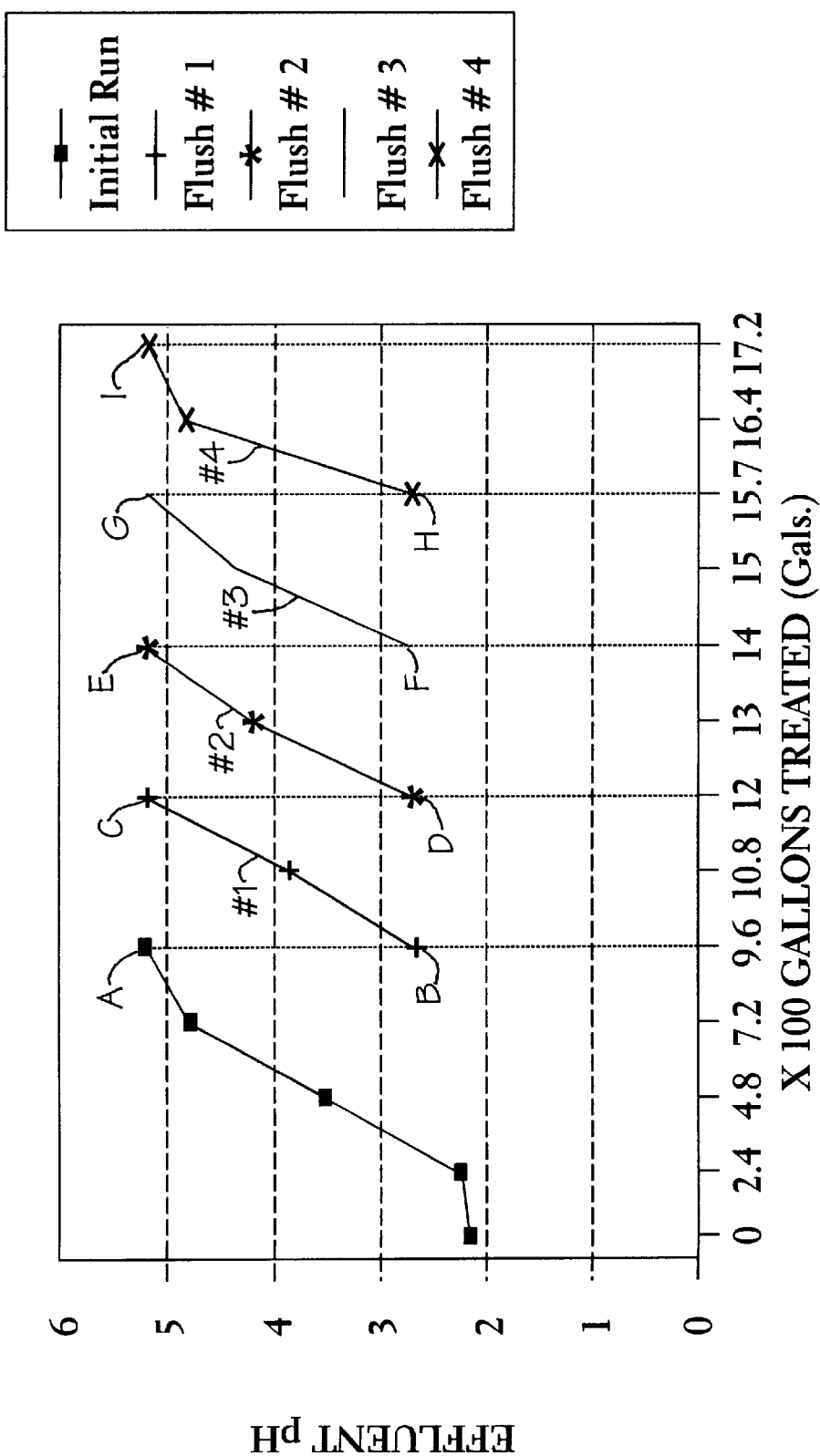
FIG. 3 is a graphic representation of the process for reactivating the activated carbon.

With the present invention as graphically illustrated in FIG. 3, an "exhausted" carbon adsorber is automatically reactivated on-line when the effluent pH drops below 8.5 and before the pH reaches the control point of 9.5. Consequently, increased adsorption capacity is attained with the carbon adsorber without having to remove the adsorber from the process line for regeneration.

The adsorption of heavy metal by activated carbon requires control of both the solution chemistry pH and the activated carbon surface pH to obtain maximum heavy metal removal. The solution pH and the activated carbon surface pH must both be monitored and adjusted to obtain the preferred heavy metal removal results. It is not sufficient to adjust only the solution pH or the activated carbon surface pH.

The capacity of activated carbon to adsorb heavy metal is not exhausted when the effluent pH is out of range of the control point (pH 8.5–10 for copper). What occurs at this point is that the acidity or alkalinity of the carbon surface has been consumed by the heavy metal adsorption process. By restoring the surface pH of the carbon in the adsorber to the initial pretreating conditions, the carbon adsorber is operable to continue the heavy metal removal process.

There are two factors which impact the effectiveness of this on-line reactivation process: (1) strength of the reactivation solution and (2) the time the chemical solution is in contact (soak) with the activated carbon. The chemical solution used to reactivate the activated carbon must have sufficient alkalinity to restore the pH of the carbon surface to the initial pretreated conditions. However, the chemical solution should not have an extreme acidity or alkalinity strength which would strip the metal from the carbon surface. In the case of copper if too strong a caustic solution is used, then the copper will desorb from the carbon surface and contaminate the chemical conditioning solution and the activated carbon will not produce a clean low concentration effluent. In the case of copper, the reactivation pH ranges between about 8.5 to 11.0. An example of the reactivation process for activated carbon used in a chromium removal application follows and is graphically illustrated in FIG. 3 with a soak time of 45–60 minutes.

EXAMPLE 3

A carbon adsorber containing 200 pounds of Calgon Carbon Filtrasorb 400 was pretreated to a pH of 2.2. The feed waste influent contained 2000 mg/l of hexavalent chromium. The pH of the waste influent was adjusted to 4.5 and processed downflow at a rate of 4 gpm, as graphically illustrated in FIG. 3. The pH of the effluent exiting the carbon adsorber started at 2.2 and gradually increased to a pH of 5.2 at position A after 4 hours of continuous operation. The adsorber was shut down, and an acid solution of pH 2.5 (14 gallons) was pumped upflow into the adsorber until the carbon pore water was displaced and a pH of 2.6 was reached at position B shown in FIG. 3. The carbon soaked in the acid solution for 45 minutes. Thereafter, the carbon adsorber was returned on-line, and the pH of the exiting effluent was 2.6. The carbon adsorber operated an additional 60 minutes or 25% of the original volume until the pH increased to 5.2 at position C shown in FIG. 3.

At position C shown in FIG. 3 the adsorber was again regenerated on-line by pumping upflow into the adsorber an acid solution of 2.5 pH. The adsorber was allowed to soak for 45 minutes. After soaking the system was returned to operation in which an additional 200 gallons was processed until a pH of 5.2 was again reached at position E in FIG. 3. This reactivation process was repeated for two more runs, F to G and H to I.

Each run was operated until the pH approached the control point of 6.0. The run time decreased about 10–15% each time until the last reactivation run lasted 35 minutes. By utilizing this on-line reactivation process, an additional 760 total gallons of waste effluent was treated before the carbon adsorber was removed from service on the process line, as shown in the graph of FIG. 3.

Further, in accordance with the present invention, the adsorption capacity of the activated carbon is enhanced by pretreating the carbon by recirculating a caustic solution in contact with the activated carbon. Superior adsorption capacity is attained by recirculating an caustic solution in contact with the carbon for up to 72 hours. In essence, the carbon is "cooked" with a 1% to 20% by volume caustic solution.

The activated carbon is regenerated with acid. In the regeneration process, the acid is consumed in the desorbing (stripping) of the heavy metals from the carbon surface. A difficulty is encountered in that as the acid is consumed the solution pH increases and the stripping process stops. The prior art processes use acid concentrations below 10% acid strength and normally experience inferior stripping results.

As the copper is being stripped from the carbon surface, the acid is consumed in the process. This is substantiated by an observed increase in solution pH as supported by the results disclosed in Example 4 below. If additional acid is not supplied to keep the pH low and provide sufficient acid, the copper stripping will stop. This occurs with a weak acid stripping solution.

Figure 4:
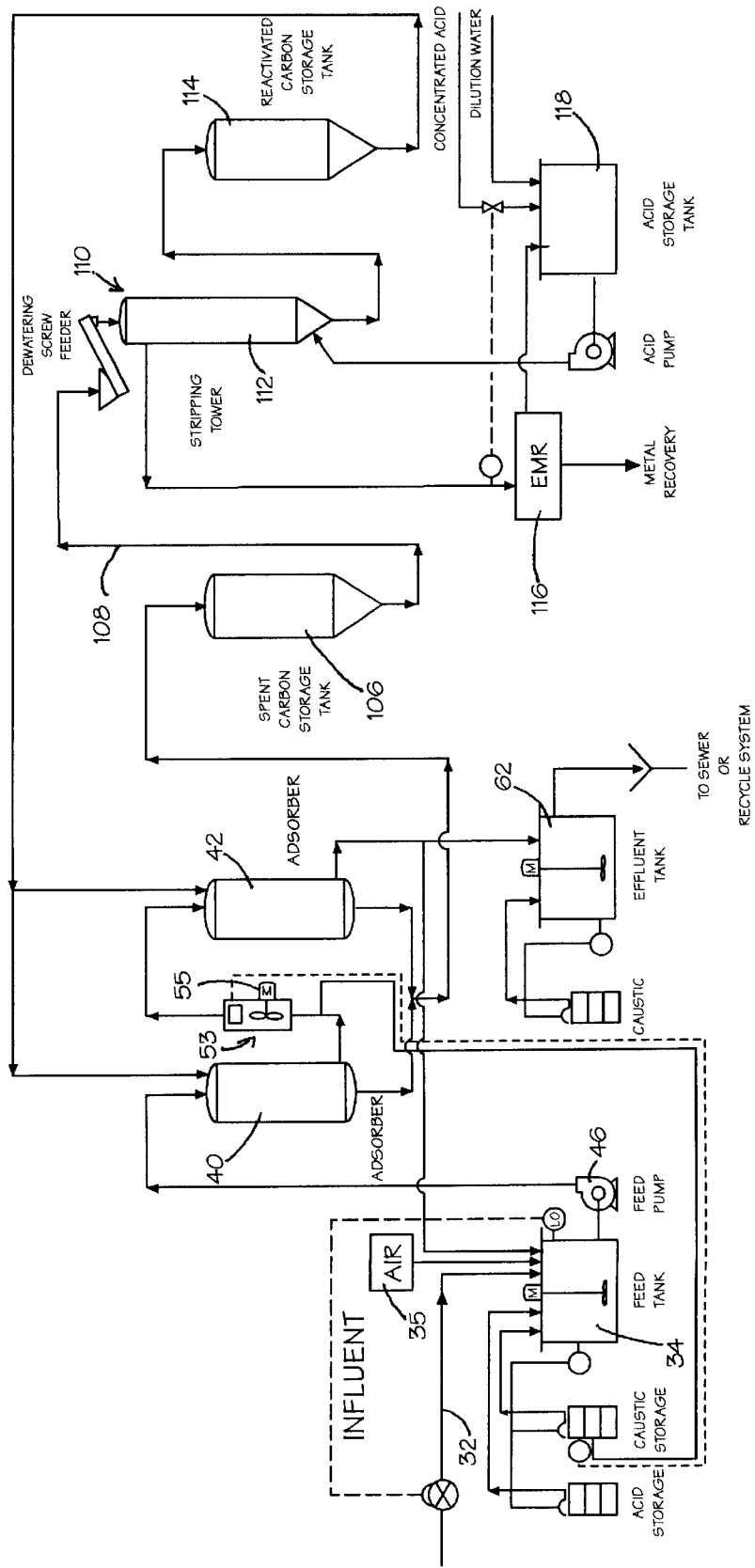
FIG. 4 is a diagrammatic illustration of an additional embodiment of the present invention.

These problems are overcome in the present invention by using a 10–20% by volume acid stripping solution to ensure sufficient acid to complete the metal stripping process. Control of the pH level is accomplished by injecting into the solution additional acid as the initial acid is consumed during the metal stripping process. The control set point for the pH unit is 1.5 to 2.5. The pH level is monitored and controlled using commercially available components that include a pH controller, metering pump, pH probe and chemical holding tank, as schematically illustrated in FIG. 4.

EXAMPLE 4

A single bed of exhausted activated carbon from a chromium removal experiment, weighing about 200 grams, was regenerated with 10% sulfuric acid. About 220 ml of acid solution was added to the bed and allowed to stand for two hours then drained. The initial solution pH was below 1.0 and after a period of two hours the pH increased to 1.8. The acid solution pH increased after being introduced to the chromium laden activated carbon.

The ability to precondition the surface of activated carbon by contacting it with a strong chemical solution is illustrated in Example 5 below. Over 118 liters of water were treated before the pH reached the influent pH. A graphical integration reveals that the average effluent pH was 1.75 over the 118 hour experiment. This data indicates the ability of activated carbon to be preconditioned thereby changing the surface pH and release the acid slowly over time.

EXAMPLE 5

Figure 5:
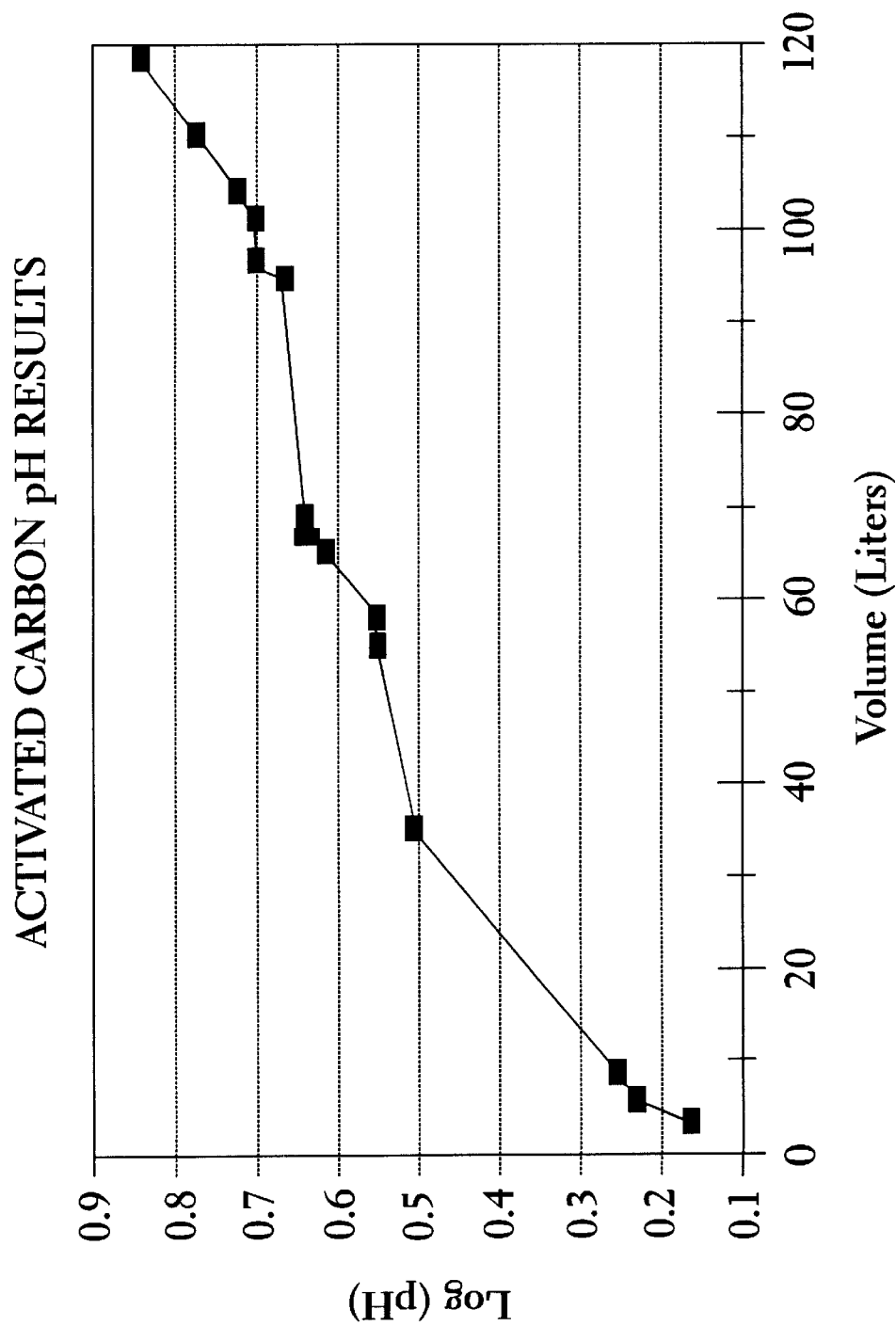
FIG. 5 is a graphic representation of the change over a period of time in the pH of effluent passed through a bed of preconditioned activated carbon.

A neutral water at pH 7.0 was pumped downflow at a flowrate of 20 mls/min through a column containing 180 grams of activated carbon preconditioned with acid to a pH of 1.5. Fresh pH 7.0 water solution was processed over 99 hours before the effluent from the carbon bed approached the influent water pH. A logarithmic plot of the effluent pH verses volume reveals a linear relationship over a major portion of the experiment. A graph of the log of the effluent pH verses the volume throughput is disclosed in FIG. 5.

The chemical regeneration of activated carbon performed in single bed systems have the following disadvantages:
1. need for multiple washing of the carbon bed which generates large quantities of stripping solution, all varying in metal concentration,
2. need for washing the carbon bed with water to remove residual metals which generates a volume of dilute metal concentration solution that adds to the overall disposal problem,
3. need for washing the carbon bed with a pretreatment solution to recondition the carbon for the metal removal cycle, and
4. need for using multiple stripping solutions generates an overall low heavy metal concentration stripping solution which is not readily amenable to electrolytic recovery.

The present invention overcomes the above inherent problems experienced with single bed chemical regeneration by utilizing a pulse bed chemical regeneration process, as illustrated in FIG. 4. The pulse bed process provides the following benefits:
1. The volume of acid required to strip the metals from a unit volume of activated carbon is greatly reduced because the same volume of acid is operable to strip multiple volumes of carbon, resulting in a concentrated heavy metal acid solution.
2. The exiting carbon from the bottom of the pulse bed is clean and does not require additional washing.
3. The time to regenerate the carbon is reduced because the various process steps for single bed processing are eliminated.
4. The cost to operate the pulse column system is significantly lower in comparison to a single bed system.

Referring to FIG. 4, there is illustrated the apparatus for performing the pulse bed chemical regeneration process of the present invention in which like elements illustrated in FIG. 2 are designated by like numerals in FIG. 4. It should be understood that the pulse bed chemical regeneration process is applicable to both acid and caustic removal of heavy metal from a waste effluent.

After either adsorber tank 40 or 42 of activated carbon is exhausted, i.e. the effluent therefrom contains high concentrations of a heavy metal species, the tank is taken off line. The activated carbon is removed from the adsorber tank and the adsorber tank is filled with clean (regenerated) carbon. The exhausted activated carbon is placed in a holding tank 106 where it is fed by a dewatering screw conveyor 108 or under air or water pressure to the top of a pulse bed column generally designated by the numeral 110. The column 110 includes a vessel 112 where in one embodiment the "clean" acid is fed at the bottom of the vessel 112 and the exhausted carbon enters the top of the vessel 112.

The flow of activated carbon and acid are in countercurrent directions. The acid flows upwardly through the column and the activated carbon flows downwardly through the column. The result is that the activated carbon exiting from the bottom of the vessel 112 is clean and the acid exiting from the top of the vessel 112 has stripped the metals from the activated carbon and is now a concentrated metal acid stream.

The carbon is removed from the vessel 112 on a predetermined basis, normally once per hour and conveyed to a storage tank 114. The acid is conveyed from the vessel 112 to a collection tank where it is stored until processed in an EMR unit 116. The amount of activated carbon removed from the pulse column 110 should not be any greater than $\frac{1}{10}$–$\frac{1}{12}$ per pulse period. The cleaned activated carbon exiting the bottom of the vessel 112 is drained. The free acid is returned to acid feed tank 118.

The cleaned carbon is stored until sufficient activated carbon is collected to fill one of the carbon adsorber tanks 40 and 42. The clean acid is 10–20% concentration by volume or has a specific gravity of 1.2 to 1.3. The exiting acid contains 20–30 grams per liter of heavy metals and has a pH between about 3.5 to 5.

According the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A method for oxidizing cyanide and recovering heavy metal from waste water comprising the steps of,
   oxygenating a waste water stream containing cyanide and heavy metal with air,
   adjusting the pH of the waste water stream to a range between about 8.5 to 10,
   pretreating the surface of a bed of adsorption material by a chemical solution having a pH in the range between about 8.5 to 11,
   passing the oxygenated pH adjusted waste water through a bed of pretreated adsorption material to oxidize cyanide in the waste water and adsorb the heavy metal in the waste water onto the surface of the adsorption material,
   directing the pH adjusted waste water free of the heavy metal and cyanide as an effluent stream away from the bed of adsorption material for discharge,
   monitoring the pH of the effluent stream exiting the bed of adsorption material to evaluate the capacity of the bed to adsorb the heavy metal while the bed remains on line,
   detecting a decrease in pH of the effluent stream to a preselected control point,
   supplying a caustic solution of a preselected pH to reactivate the bed of adsorption material while on line when the pH of the effluent stream reaches the control point to restore the adsorptive capacity of the bed,
   maintaining the caustic solution in contact with the bed of exhausted adsorption material for a preselected period of time until the pH of the surface of the bed of adsorption material is restored to a preselected pH level,
   passing an acid stripping solution through the bed of adsorption material to strip the heavy metal from the surface of the adsorption material,
   passing the stripping solution containing the heavy metal to an electrolytic recovery unit,
   electrolytically depositing the heavy metal from the stripping solution onto a cathode terminal in the electrolytic unit,
   recovering the heavy metal deposited onto the cathode terminal, and
   reusing the retained stripping solution in subsequent cycles of stripping heavy metal from the surface of the adsorption material.

2. A method for oxidizing cyanide and recovering heavy metal from waste water as set forth in claim 1 which includes,
   circulating an acid solution containing sulfuric acid in a range of 10–20% by volume at a pH between 1.5 to 2.5 through the bed to regenerate the bed for adsorption of heavy metal from the waste water stream.

3. A method for oxidizing cyanide and recovering heavy metal from waste water as set forth in claim 2 which includes,
   circulating the acid solution through the bed of adsorption material at a preselected flow rate for a period of 1 to 2 hours.

4. A method for oxidizing cyanide and recovering heavy metal from waste water as set forth in claim 1 which includes,
   interrupting the flow of the oxygenated pH adjusted waste water through the bed of pretreated adsorption material when the pH of the effluent stream drops below 8.5,
   circulating a caustic solution containing sodium hydroxide in a range of 1% to 10% by volume at a pH between 8 to 11 through the adsorption material until the pH of the surface of adsorption material is about 9.0, and
   resuming the flow of the waste water through the bed of adsorption material to adsorb the heavy metal onto the surface of the bed until the pH of the effluent stream passing away from the bed reaches a pH in the range between about 8.5 to 11.

5. A method for oxidizing cyanide and recovering heavy metal from waste water as set forth in claim 4 which includes,
   recirculating the caustic solution through the adsorption material for a period of eight hours to restore the surface pH of the adsorption material to a level for adsorbing the heavy metal onto the surface of the adsorption material.

6. A method for oxidizing cyanide and recovering heavy metal from waste water as set forth in claim 1 which includes,
   pretreating the surface of the bed of adsorption material by circulating through the bed a solution containing 1% by volume of a pretreating caustic solution for a period of time up to 72 hours.

7. A method for oxidizing cyanide and recovering heavy metal from waste water as set forth in claim 6 which includes,
   reactivating the surface of the bed of adsorption material by circulating through the bed a sodium hydroxide solution having a pH at a level to restore the capacity of the bed to adsorb heavy metal without stripping from the bed the heavy metal absorbed in the bed.

8. A method for oxidizing cyanide and recovering heavy metal from waste water as set forth in claim 6 which includes,
   pretreating the surface of the bed of adsorption material for oxidizing cyanide from the waste water by circulating a sodium hydroxide solution having a pH between about 8.5 to 11 through the bed for about 1 hour.

9. A method for oxidizing cyanide while simultaneously recovering copper from waste water comprising the steps of,
   oxygenating a waste water stream containing cyanide and copper with air, adjusting the pH level of the waste water stream to a range between about 8.5 to 10, pretreating a bed of activated carbon by circulating in a closed loop a solution containing 1% to 20% by volume sodium hydroxide through the bed of activated carbon for a preselected period of time until the pH of the surface of the bed reaches a level of 8.5 to 11, directing the waste water stream containing cyanide and copper through the bed of activated carbon, adsorbing the copper onto the surface of the activated carbon bed while oxidizing the cyanide, monitoring the pH of the waste water stream exiting the bed of activated carbon to evaluate the capacity of the bed to adsorb the copper while the bed remains on line, detecting a decrease in the pH of the waste water stream to a preselected control point, supplying a caustic solution of a preselected pH to reactivate the activated carbon bed while in operation when the pH of the waste water stream reaches the control point to restore the adsorptive capacity of the bed, maintaining the caustic solution in contact with the activated carbon bed for a preselected period of time until the pH of the surface of the carbon bed is restored to a preselected pH level, interrupting the flow of waste water once the adsorptive capacity of the adsorption material in the carbon bed is exhausted, passing a stripping solution containing 10% to 20% by volume sulfuric acid through the exhausted activated carbon bed to strip the copper from the bed, maintaining the pH of the stripping solution at a level between about 1.5 to 2.5 by feeding fresh acid into the stripping solution to continue stripping copper from the bed, directing the stripping solution containing copper to an electrolytic recovery unit, electrolytically depositing copper from the stripping solution onto a cathode terminal of the electrolytic recovery unit, and removing the deposited copper from the cathode terminal.

10. A method for oxidizing cyanide while simultaneously recovering copper from waste water as set forth in claim 9 which includes, interrupting the steps of directing a flow of waste water through the activated carbon bed and passing the caustic solution through the activated carbon bed, and circulating a caustic solution having a pH of 10.0 through the activated carbon bed for a preselected period of time to restore the surface of the activated carbon bed to a pH of about 9.5.

11. A method for oxidizing cyanide while simultaneously recovering copper from waste water as set forth in claim 10 which includes, continuing the flow of waste water through the activated carbon bed followed by passing the caustic solution through the activated carbon bed until the waste water stream passing from the bed exceeds a pH of about 9.5, and interrupting the steps of directing a flow of waste water through the activated carbon bed and passing the stripping solution through the activated carbon bed to repeat the step of restoring the surface of the activated carbon bed to a pH of about 9.5.

12. A method for oxidizing cyanide while simultaneously recovering copper from waste water as set forth in claim 11 which includes, repeating the steps of directing waste water through the activated carbon bed, passing a caustic solution through the activated carbon bed, and maintaining the surface of the activated carbon bed at a pH of about 9.5 to maintain continuous operation of the recovery of copper from the waste water until the bed reaches its capacity to remove copper from the waste water stream.

13. A method for oxidizing cyanide while simultaneously recovering copper from waste water as set forth in claim 9 which includes, pretreating the bed of activated carbon by circulating the solution containing 1% to 20% by volume sodium hydroxide stripping solution through the bed for a period of time of up to 72 hours.

14. A method for oxidizing cyanide while simultaneously recovering copper from waste water as set forth in claim 9 which includes, maintaining the surface alkalinity of the activated carbon bed at a pH of between about 8.5 to 11.0.

* * * * *